(12) United States Patent
Kiranyaz et al.

(10) Patent No.: US 10,586,153 B2
(45) Date of Patent: Mar. 10, 2020

(54) METHOD AND APPARATUS FOR PERFORMING MOTOR-FAULT DETECTION VIA CONVOLUTIONAL NEURAL NETWORKS

(71) Applicant: QATAR UNIVERSITY, Doha (QA)

(72) Inventors: Serkan Kiranyaz, Doha (QA); Turker Ince, Izmir (TR); Levent Eren, Izmir (TR)

(73) Assignee: QATAR UNIVERSITY, Doha (QA)

( * ) Notice: Subject to any disclaimer, the term of this patent is extended or adjusted under 35 U.S.C. 154(b) by 652 days.

(21) Appl. No.: 15/184,372

(22) Filed: Jun. 16, 2016

(65) Prior Publication Data

US 2017/0364800 A1 Dec. 21, 2017

(51) Int. Cl.
*G06N 3/08* (2006.01)
*G05B 23/02* (2006.01)
*G06F 11/26* (2006.01)

(52) U.S. Cl.
CPC ........... *G06N 3/084* (2013.01); *G05B 23/024* (2013.01); *G05B 23/0221* (2013.01); *G06F 11/26* (2013.01)

(58) Field of Classification Search
None
See application file for complete search history.

(56) References Cited

U.S. PATENT DOCUMENTS

| 5,629,870 A * | 5/1997 | Farag | G01R 31/343 324/558 |
| 2003/0055610 A1* | 3/2003 | Webber | G06F 17/15 702/194 |
| 2013/0013138 A1* | 1/2013 | Lu | 701/22 |

OTHER PUBLICATIONS

Kiranyaz, Serkan, et al. "Convolutional Neural Networks for patient-specific ECG classification." Engineering in Medicine and Biology Society (EMBC), 2015 37th Annual International Conference of the IEEE. IEEE, 2015. (Year: 2015).*
Wright, Isabel A., et al. "Neural network analysis of Doppler ultrasound blood flow signals: A pilot study." Ultrasound in medicine & biology 23.5 (1997): 683-690. (Year: 1997).*
R. Di Stefano et al., "Induction Motor Fault Diagnostic via Artificial Neural Network," in Proceedings of the IEEE International Symposium on Industrial Electronics (ISIE' 94), Santiago, 1994, pp. 220-225.
B. Li et al., "Neural Network Based Motor Rolling Bearing Fault Diagnosis," IEEE Transactions on Industrial Electronics, vol. 47, No. 5, Oct. 2000.
G. F. Bin et al., "Early Fault Diagnosis of Rotating Machinery Based on Wavelet Packets—Empirical Mode Decomposition Feature Extraction and Neural Network," Mechanical Systems and Signal Processing, vol. 27, pp. 696-711, 2012.
X. Li et al., "Rolling Element Bearing Fault Detection Using Support Vector Machine with Improved Ant Colony Optimization," Measurement, vol. 46, No. 8, pp. 2726-2734, 2013.

(Continued)

*Primary Examiner* — Vincent Gonzales
*Assistant Examiner* — Daniel T Pellett
(74) *Attorney, Agent, or Firm* — Squire Patton Boggs (US) LLP (57) ABSTRACT

A method and apparatus may include receiving a signal from a motor. The signal is received while the motor is operating. The method also includes performing a pre-processing of the signal. The method also includes inputting the signal to a 1D convolutional neural network. The method also includes detecting a fault of the motor based on the output of the neural network.

15 Claims, 9 Drawing Sheets

(56) References Cited

OTHER PUBLICATIONS

K. Kim et al., "Sensorless Fault Diagnosis of Induction Motors," IEEE Transactions on Industrial Electronics, vol. 50, No. 5, pp. 1038-1051, Oct. 2003.
C.T. Kowalski et al., "Neural Network Application for Induction Motor Faults Diagnosis," Mathematics and Computers in Simulation, vol. 63, No. 3-5, pp. 435-448, Nov. 2003.
V. T. Tung et al., "Fault Diagnosis of Induction Motor Based on Decisiion Trees and Adaptive Neurofuzzy Inference," Expert Systems with Applications, vol. 36, No. 2, pp. 1840-1849, 2009.
W. Y. Chen et al., "Application of Artificial Intelligence Techniques to the Study of Machine Signatures," in Proceedings of the XX IEEE International Conference on Electrical Machines (ICEM' 2012), Marseille (France), 2012, pp. 2390-2396.
M. S. Ballal et al., "Adaptive Neural Fuzzy Inference System for the Detection of Inter-Turn Insulation and Bearing Wear Faults in Induction Motor", IEEE Transactions on Industrial Electronics, vol. 54, No. 1, pp. 250-258, 2007.

\* cited by examiner

1) Initialize weights (usually randomly, U(-a, a))
2) For each BP iteration DO:
   a. For each item (or a group of items or all items) in the dataset, DO:
      i. FP: Forward propagate from the input layer to the output layer to find outputs of each neuron at each layer, $y_i^l, \forall i \in [1, N_l] \text{ and } \forall l \in [1, L]$
      ii. BP: Compute delta error at the output layer and back-propagate it to first hidden layer to compute the delta errors, $\Delta_k^l, \forall k \in [1, N_l] \text{ and } \forall l \in [2, L-1]$
      iii. PP: Post-process to compute the weight and bias sensitivities.
      iv. Update: Update the weights and biases with the (accumulation of) sensitivities found in (c) scaled with the learning factor, $\varepsilon$:

$$w_{ik}^{l-1}(t+1) = w_{ik}^{l-1}(t) - \varepsilon \frac{\partial E}{\partial w_{ik}^{l-1}}$$

$$b_k^l(t+1) = b_k^l(t) - \varepsilon \frac{\partial E}{\partial b_k^l}$$

METHOD AND APPARATUS FOR PERFORMING MOTOR-FAULT DETECTION VIA CONVOLUTIONAL NEURAL NETWORKS

BACKGROUND

Field

Certain embodiments of the present invention relate to performing motor-fault detection via convolutional neural networks.

Description of the Related Art

A convolutional neural network generally refers to a type of feed-forward artificial neural network. A feed-forward neural network may be considered to be a network where the information is transmitted through the network in a single direction. For example, information may be transmitted to the network via input nodes, through hidden nodes (if applicable), and to output nodes (if applicable). Backpropagation is generally considered to be a method of training neural networks where the networks can learn the appropriate internal representations/weights to allow the networks to learn correspondences between inputs and outputs.

SUMMARY

According to a first embodiment, a method can include receiving a signal from a motor. The signal is received while the motor is operating. The method can also include performing a pre-processing of the signal. The method can also include inputting the signal to a 1D convolutional neural network. The method can also include detecting a fault of the motor based on an output of the neural network.

In the method of the first embodiment, receiving the signal includes receiving the signal from an induction motor.

In the method of the first embodiment, performing the pre-processing of the signal includes at least one of down-sampling the signal, filtering the signal, and normalizing the signal.

In the method of the first embodiment, receiving the signal includes receiving a motor current signal.

In the method of the first embodiment, the 1D convolution neural network can be configured to perform a plurality of back-propagation iterations, and to update weights and bias sensitivities of the 1D convolution neural network for each back-propagation iteration.

In the method of the first embodiment, detecting the fault of the motor includes detecting a bearing fault of the motor.

According to a second embodiment, an apparatus can include at least one processor. The apparatus can also include at least one memory including computer program code. The at least one memory and the computer program code can be configured, with the at least one processor, to cause the apparatus at least to receive a signal from a motor. The signal is received while the motor is operating. The apparatus is also caused to perform a pre-processing of the signal. The apparatus is also caused to input the signal to a 1D convolutional neural network. The apparatus is also caused to detect a fault of the motor based on an output of the neural network.

In the apparatus of the second embodiment, receiving the signal includes receiving the signal from an induction motor.

In the apparatus of the second embodiment, performing the pre-processing of the signal includes at least one of down-sampling the signal, filtering the signal, and normalizing the signal.

In the apparatus of the second embodiment, receiving the signal includes receiving a motor current signal.

In the apparatus of the second embodiment, the 1D convolution neural network is configured to perform a plurality of back-propagation iterations, and to update weights and bias sensitivities of the 1D convolution neural network for each back-propagation iteration.

In the apparatus of the second embodiment, detecting the fault of the motor includes detecting a bearing fault of the motor.

According to a third embodiment, a computer program product can be embodied on a non-transitory computer readable medium. The computer readable medium has instructions stored thereon that, when executed by a computer, causes the computer to perform a method. The method includes receiving a signal from a motor. The signal is received while the motor is operating. The method also includes performing a pre-processing of the signal. The method also includes inputting the signal to a 1D convolutional neural network. The method also includes detecting a fault of the motor based on an output of the neural network.

In the computer program product of the third embodiment, receiving the signal includes receiving the signal from an induction motor.

In the computer program product of the third embodiment, performing the pre-processing of the signal includes at least one of down-sampling the signal, filtering the signal, and normalizing the signal.

In the computer program product of the third embodiment, receiving the signal comprises receiving a motor current signal.

In the computer program product of the third embodiment, the 1D convolutional neural network is configured to perform a plurality of back-propagation iterations, and to update weights and bias sensitivities of the 1D convolution neural network for each back-propagation iteration.

In the computer program product of the third embodiment, detecting the fault of the motor comprises detecting a bearing fault of the motor.

According to a fourth embodiment, an apparatus can include receiving means to receive a signal from a motor. The signal is received while the motor is operating. The apparatus also includes performing means to perform a pre-processing of the signal. The apparatus also includes inputting means to input the signal to a 1D convolutional neural network. The apparatus also includes detecting means to detect a fault of the motor based on an output of the neural network.

BRIEF DESCRIPTION OF THE DRAWINGS

For proper understanding of the invention, reference should be made to the accompanying drawings, wherein.

DETAILED DESCRIPTION

Certain embodiments of the present invention relate to performing motor-fault detection by using convolutional neural networks (CNNs). The ability to perform early detection of faults within motors is considered to be a very desirable/essential function, and Artificial Neural Networks (ANNs) are widely used for performing such early detection.

Motor-fault detection and diagnosis methods can generally be divided into two categories: model-based methods and signal-based methods. Model-based methods use mathematical models to describe the normal operating conditions of motors (such as induction motors, for example).

Signal-based methods generally perform two distinct operations: (1) feature extraction, and (2) classification of the extracted features. Although the previous approaches are generally able to perform accurate detection of anomalies/faults, most of the previous approaches have to utilize a variety of different features and/or classifiers (to perform feature extraction and classification) for the different/various types of motor data. For each specific type of signal/motor data, the important step of choosing the appropriate feature to characterize from within the signal/motor data can be a very difficult step to perform.

The fixed and manually-configured/hand-crafted features (which are used to perform feature extraction) of the previous approaches may not accurately represent the characteristics of every type of motor current signal in an optimal way, and thus the previous approaches generally cannot accomplish a general solution that can be used for any motor data. In other words, because, for each particular type of signal (i.e., motor current data), it is unknown which feature extraction is the best choice, the previous approaches struggle with extracting the proper feature. Furthermore, feature extraction usually turns out to be a computationally-costly operation, which eventually may hinder the usage of such methods in applications that monitor motors in real-time.

Certain embodiments of the present invention address the above-described drawbacks and limitations of using Convolutional Neural Networks (CNNs) in accordance with the previous approaches. Certain embodiments are directed to a fast and accurate motor-condition monitoring system, with an adaptive implementation of 1D CNNs to inherently combine the feature extraction and classification functions into a single learning body. Certain embodiments of the present invention may directly classify input signal samples acquired from the motor current which can be the line current data of the motor captured at 128 points per cycle using an industrial circuit monitor. As such, certain embodiments may be directed to an efficient system, in terms of speed, that may be used in real-time applications.

As mentioned above, due to the CNN's ability to learn how to extract the optimal features, with the proper training, certain embodiments of the present invention can perform classification and fault detection accurately.

The main sources of failure within induction machines/motors include both mechanical-type failures that are caused by faults within bearings faults, as well as electrical-type failures that are caused by insulation or winding faults. Bearing faults are, by far, the predominant cause of all motor failures. Bearing faults are the most difficult type of fault to detect, while also being the least expensive type of fault to fix when these types of faults are detected early enough. As such, certain embodiments of the present invention are directed to enabling the early detection of bearing faults.

Figure 1:
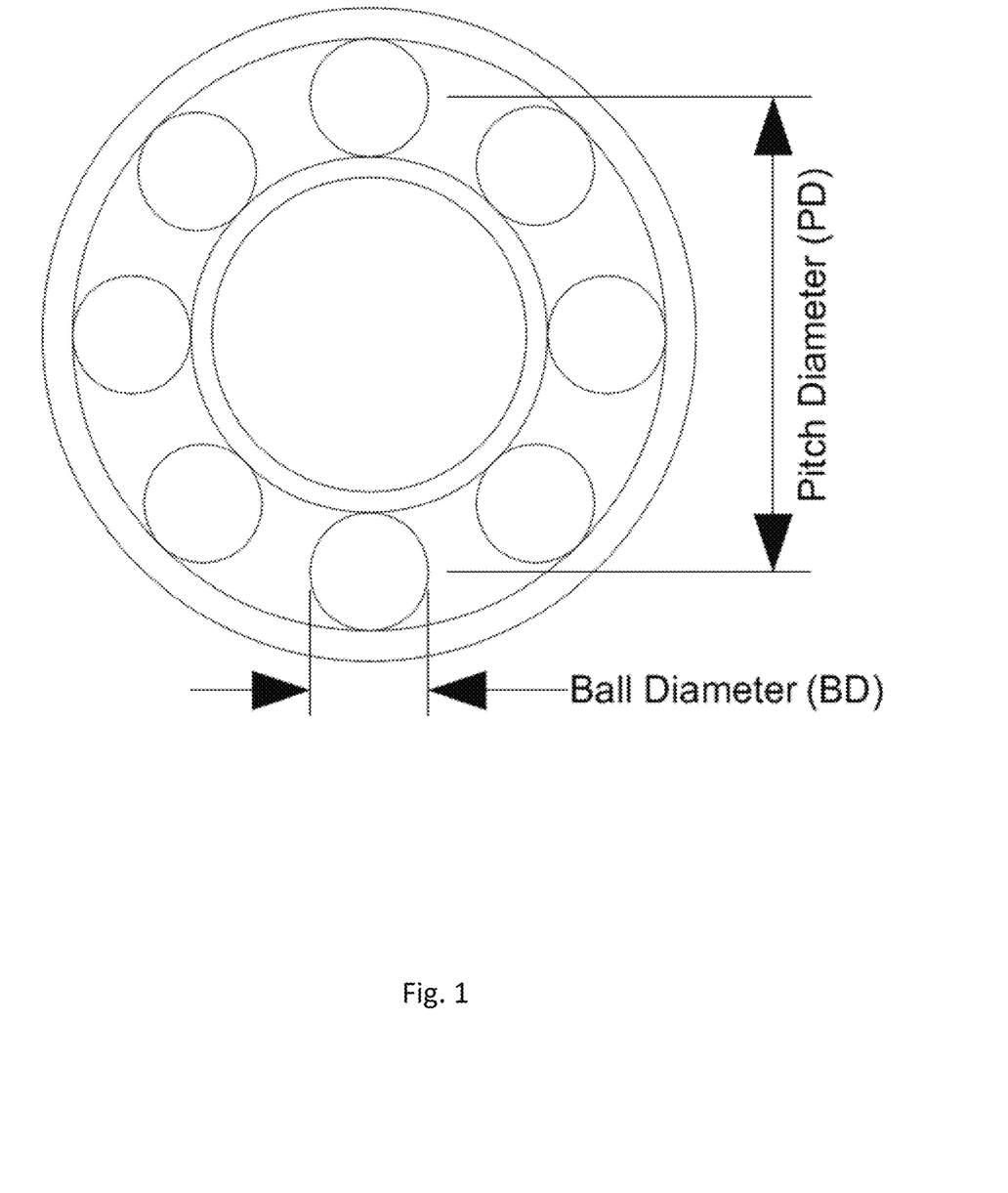
FIG. 1 illustrates a typical ball-bearing geometry.

Bearing faults generally result from mechanical defects, and bearing faults generally cause vibration at fault-related frequencies. The fault-related frequencies can be determined based upon a known bearing geometry and a known shaft speed. FIG. 1 illustrates a typical ball-bearing geometry.

The equations that are used for calculating both characteristic vibration frequencies due to the presence of bearing faults and the resulting current frequencies are given as follows:

Outer race defect frequency, $f_{OD}$, the ball passing frequency on the outer race, is given by $$f_{OD} = \frac{n}{2} f_{rm}\left(1 - \frac{BD}{PD}\cos\phi\right) \quad (1)$$

where $f_{rm}$ is the rotor speed in revolutions per second, n is the number of balls, and the angle $\phi$ is the contact angle, which is zero for ball bearings.

Inner race defect frequency $f_{ID}$, the ball passing frequency on the inner race, is expressed as $$f_{ID} = \frac{n}{2} f_{rm}\left(1 + \frac{BD}{PD}\cos\phi\right) \quad (2)$$

Cage defect frequency $f_{CD}$, caused by irregularity in the rolling element train, is given by $$f_{CD} = \frac{1}{2} f_{rm}\left(1 - \frac{BD}{PD}\cos\phi\right) \quad (3)$$

Ball defective frequency $f_{BD}$, the ball spin frequency, is given by $$f_{BD} = \frac{PD}{2BD} f_{rm}\left(1 - \left(\frac{BD}{PD}\right)^2 \cos^2\phi\right) \quad (4)$$

The mechanical vibration due to a bearing defect may also result in air gap eccentricity. Oscillations in air gap width, in turn, may cause variations in flux density. The variations in flux density affect the machine inductances that produce stator current vibration harmonics. The characteristic current frequencies, $f_{CF}$, due to bearing characteristic vibration frequencies can be expressed as $$f_{CF} = |f_e \pm mf_v| \quad (5)$$

where $f_e$ is the line frequency, m is an integer and $f_v$ is the characteristic vibration frequency obtained from Eqs. 1-4 above. Detection of the above frequencies (within a motor current signal) by certain embodiments of the present invention may result in detection of a fault within the motor.

Figure 2:
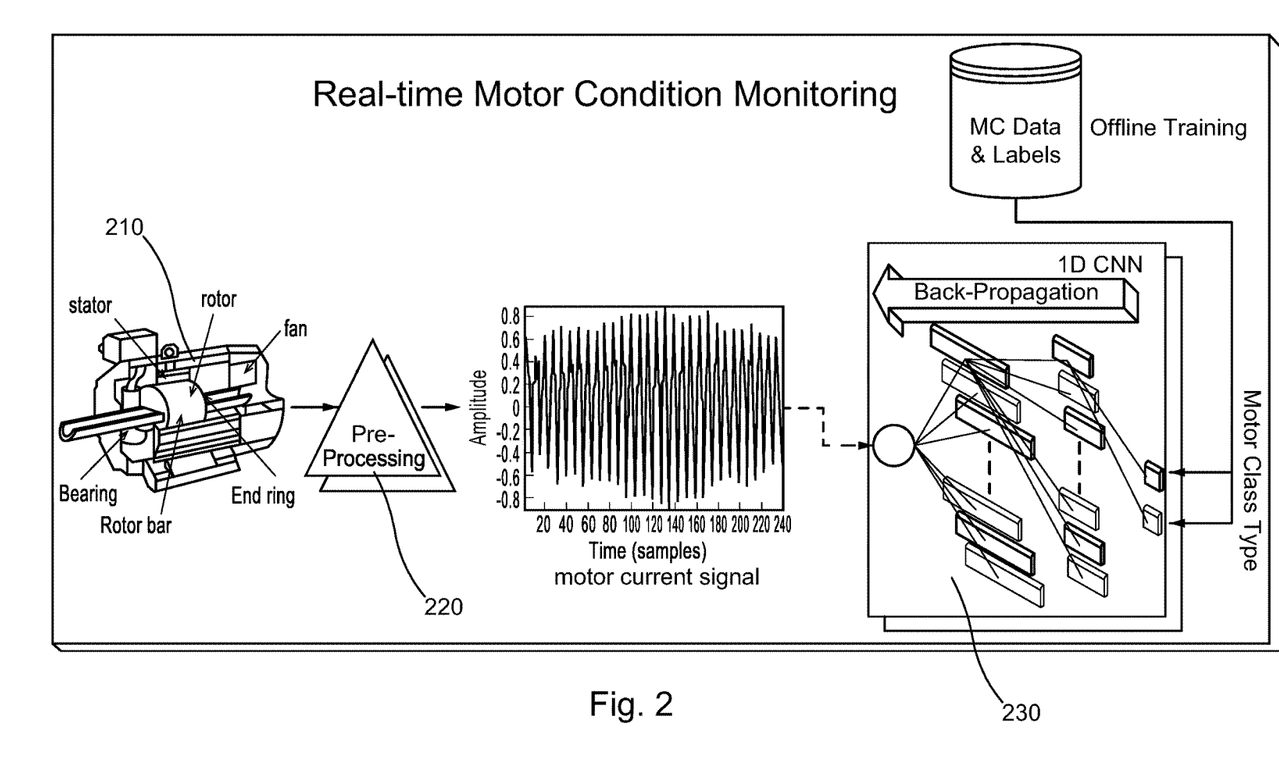
FIG. 2 illustrates performing real-time motor-condition monitoring in accordance with certain embodiments of the present invention.

FIG. 2 illustrates performing real-time motor-condition monitoring in accordance with certain embodiments of the present invention. Certain embodiments of the present invention receive signals from a motor 210 to identify potential faults within the motor. For example, certain embodiments may identify potential faults based on the fault-related frequencies described above. Specifically, with certain embodiments, the signals from the motor are input into a 1D convolutional neural network classifier 230. The input signals that are received from the motors can also undergo a pre-processing step 220 before being input into the 1D CNN classifier 230.

Simple 1D CNNs may be easier to train, as training generally involves only a few hundred back-propagation (BP) epochs. As such, with the simple 1D CNNs, certain embodiments can perform the classification task with great speed (generally requiring only few hundreds of 1D convolutions). As such, certain embodiments can use the simple 1D CNNs for performing real-time, and cost-effective, motor fault detection within early fault-alert systems.

With regard to the preprocessing, with certain embodiments, an input signal may be filtered by a second-order notch filter in order to suppress a fundamental frequency for preprocessing. The input signal may be down-sampled (for example, by a factor of 8) by performing a decimation preceded by an anti-aliasing filtering. The input signal may be a motor current signal. The decimated signal may then be normalized properly to be the input of the 1D CNN classifier. The decimation allows the usage of a simpler CNN configuration, which, in turn, improves both training and detection speeds. Finally, the training and test sets may be normalized to have a zero mean and to have uniform standard deviation, in order to remove the effect of DC offset and amplitude biases. Then, the training and test sets can be linearly scaled into a [−1, 1] interval, before being presented to the CNN classifier.

Figure 3:
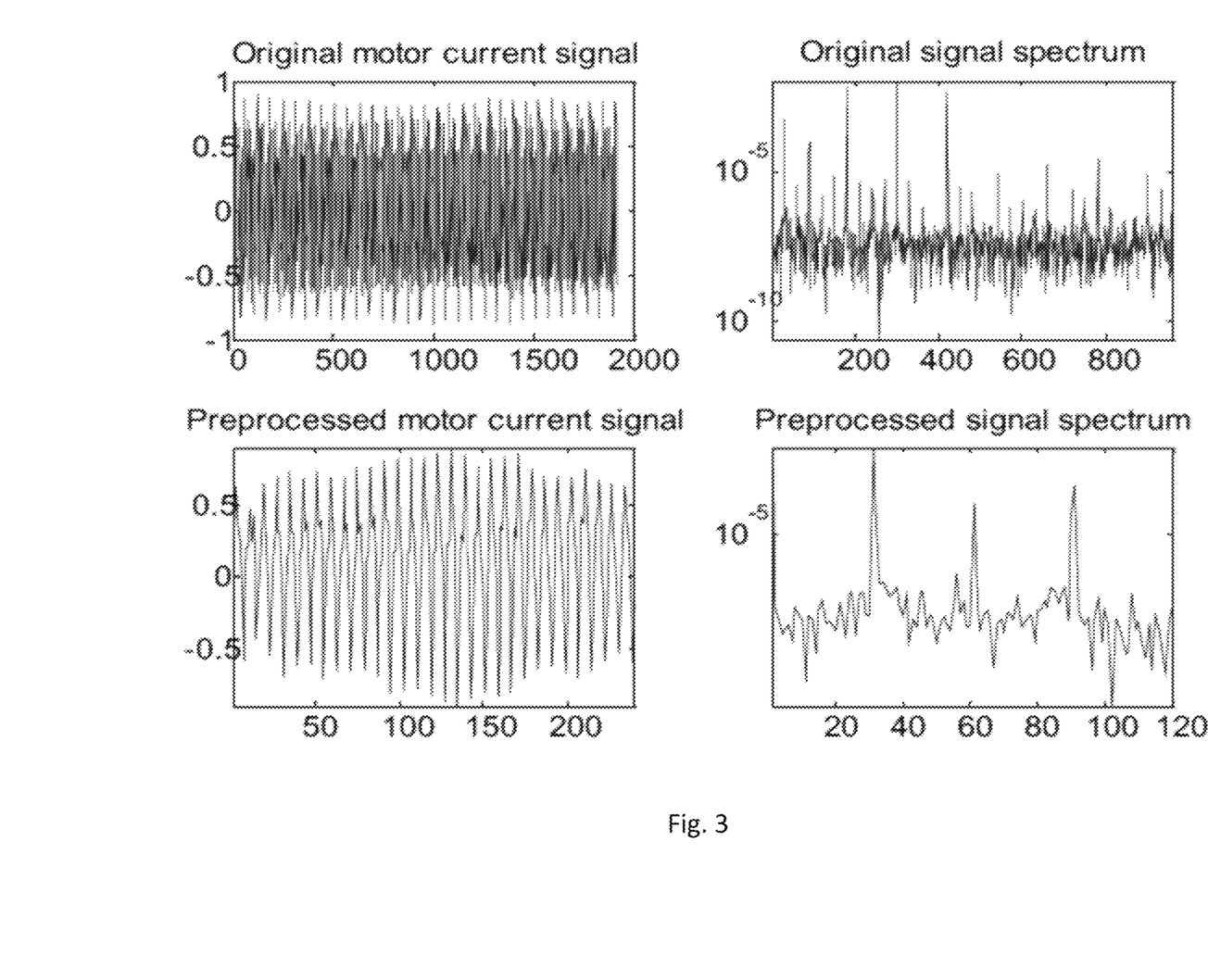
FIG. 3 illustrates a healthy motor current signal, as well as its amplitude spectrum, before and after performing preprocessing, in accordance with certain embodiments of the present invention.
Figure 4:
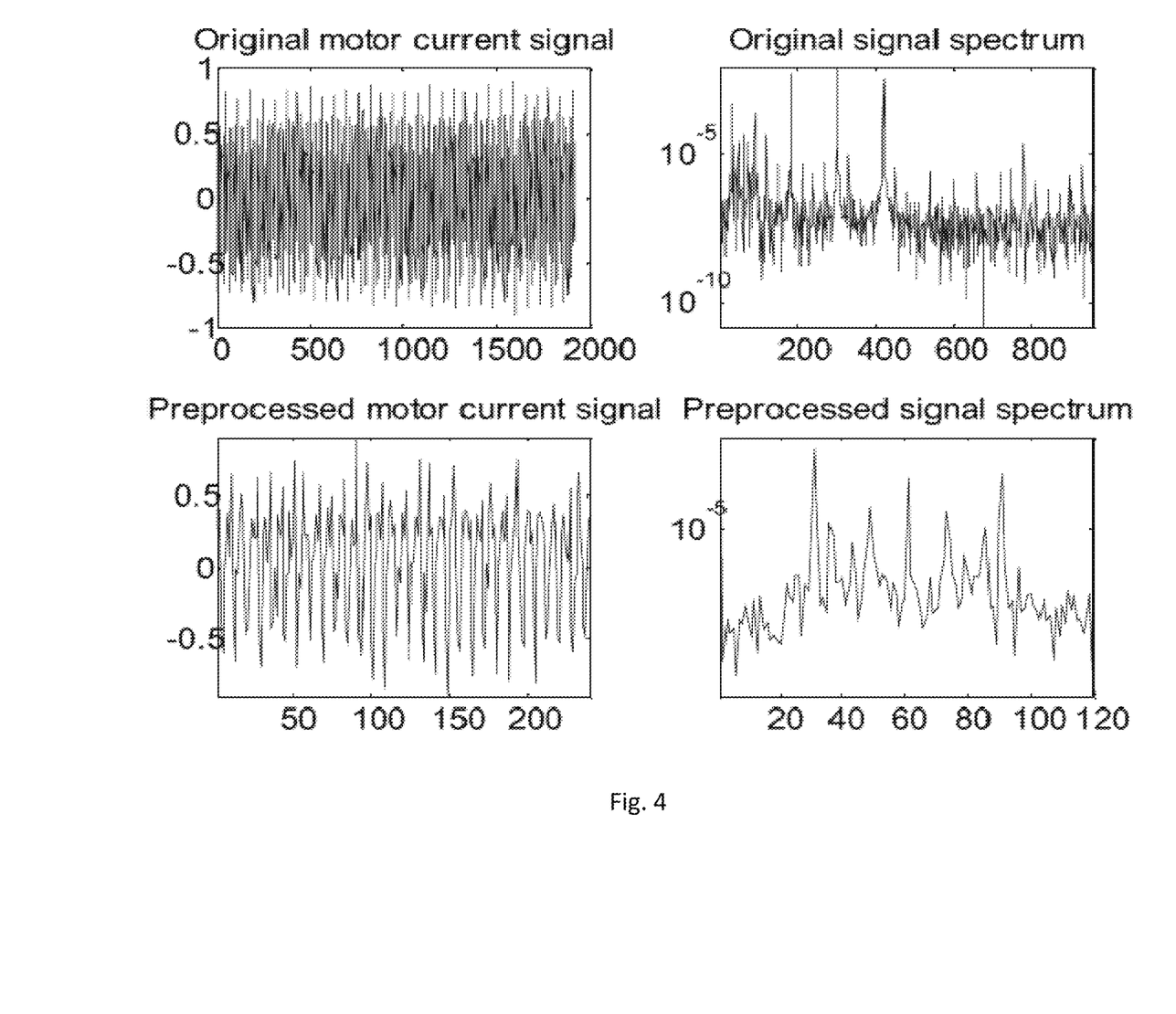
FIG. 4 illustrates a faulty motor current signal, and its amplitude spectrum, before and after preprocessing, in accordance with certain embodiments of the present invention.

FIG. 3 illustrates a healthy motor current signal, as well as its amplitude spectrum, before and after performing preprocessing. FIG. 4 illustrates a faulty motor current signal, and its amplitude spectrum, before and after preprocessing.

Certain embodiments of the present invention may utilize back-propagation techniques with the adaptive 1D CNNs. Specifically, certain embodiments can utilize an adaptive 1D CNN configuration in order to combine feature extraction and learning (fault detection) phases, when receiving the raw motor current signals. The adaptive CNN topology can allow certain embodiments to work with any input layer dimension.

Figure 5:
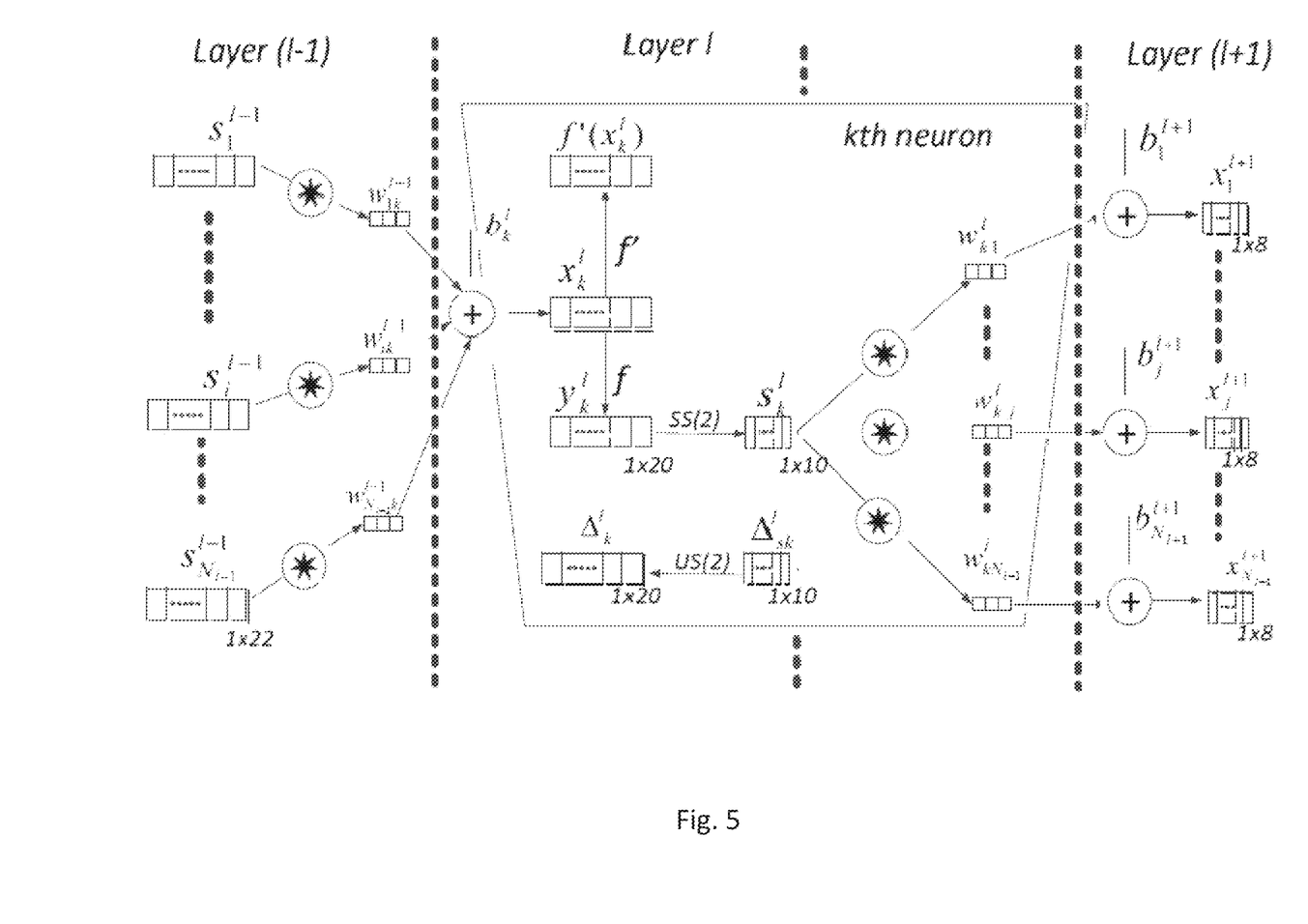
FIG. 5 illustrates convolution layers of an adaptive convolution neural network (CNN) configuration, in accordance with certain embodiments of the present invention.

Furthermore, the proposed adaptive CNN topology of certain embodiments may be configured such that hidden neurons of the convolution layers can perform both convolution and sub-sampling operations. FIG. 5 illustrates the convolution layers of the adaptive CNN configuration, in accordance with certain embodiments of the present invention.

With certain embodiments of the present invention, the combining of a convolution and a sub sampling layer may be considered to be the "CNN layer," while the remaining layers may be considered to be the multilayer perceptron (MLP) layers. So, the 1D CNNs may include an input layer, hidden CNN and MLP layers, and an output layer.

Further, structural differences are visible between the traditional 2D and the proposed 1D CNNs. One difference is the usage of 1D arrays instead of 2D matrices for both kernels and feature maps. Accordingly, the 2D matrix manipulations such as 2D convolution (conv2D) and lateral rotation (rot180) have now been replaced by their 1D counterparts, conv1D and reverse. Moreover, the parameters for kernel size and sub-sampling are now scalars, K and ss for 1D CNNs, respectively. However, the MLP layers may be similar to the layers of the 2D counterpart and, therefore, certain embodiments may have a traditional BP formulation. In 1D CNNs, the 1D forward propagation (FP) from a previous convolution layer, l−1, to the input of a neuron in the current layer, l, can be expressed as, $$x_k^l = b_k^l + \sum_{i=1}^{N_{l-1}} conv1D(w_{ik}^{l-1}, s_i^{l-1}) \tag{6}$$

Where $x_k^l$ is the input, $b_k^l$ is a scalar bias of the kth neuron at layer l, and $s_i^{l-1}$ is the output of the ith neuron at layer l−1. $W_{ik}^{l-1}$ is the kernel from the ith neuron at layer l−1 to the kth neuron at layer l.

The intermediate output of the neuron, $y_k^l$, can then be expressed from the input, $x_k^l$, as follows:

$$y_k^l = f(x_k^l) \text{ and } s_k^l = y_k^l \downarrow ss \tag{7}$$

Where $s_k^l$ is the output of the neuron and $\downarrow$ ss represents the down-sampling operation with the factor, ss. The adaptive CNN configuration may use the automatic assignment of the sub-sampling factor of the output CNN layer (the last CNN layer). It may be set to the size of its input array. For instance, in FIG. 5, assuming that the layer l+1 is the last CNN layer, then ss=8 automatically because the input array size is 8. Such a design allows the usage of any number of CNN layers. This adaptation capability is possible in this CNN configuration because the output dimension of the last CNN layer can automatically be downsized to 1 (scalar), regardless from the native subsampling factor parameter that was set in advance for the CNN.

The back-propagation (BP) steps of certain embodiments are described below. The BP of the error can start from the output MLP layer. Let l=1 and l=L be the input and output layers, respectively. Also, let NL be the number of classes in the database. For an input vector p, and its corresponding target and output vectors, $$t_i^p \text{ and } [y_1^L, \ldots, y_{N_L}^L]$$

respectively, the mean-squared error (MSE) in the output layer for the input p, Ep, can be expressed as follows:

$$E_p = MSE(t_i^p, [y_1^L, \ldots, y_{N_L}^L]) = \sum_{i=1}^{N_L} (y_i^L - t_i^p)^2 \tag{8}$$

The objective of the BP is minimize the contributions of network parameters to this error. Therefore, certain embodiments compute the derivative of the MSE with respect to an individual weight (connected to that neuron, k) $w_{ik}^{l-1}$, and a bias of the neuron k, $b_k^l$, so that certain embodiments can perform a gradient descent method to minimize their contributions and hence the overall error in an iterative manner. Specifically, the delta of the kth neuron at layer l, $\Delta_k^l$ will be used to update the bias of that neuron and all weights of the neurons in the previous layer connected to that neuron, as, $$\frac{\partial E}{\partial w_{ik}^{l-1}} = \Delta_k^l y_i^{l-1} \text{ and } \frac{\partial E}{\partial b_k^l} = \Delta_k^l \quad (9)$$

So, from the first MLP layer to the last CNN layer, the regular (scalar) BP is simply performed as, $$\frac{\partial E}{\partial s_k^l} = \Delta s_k^l = \sum_{i=1}^{N_{l-1}} \frac{\partial E}{\partial x_i^{l+1}} \frac{\partial x_i^{l+1}}{\partial s_k^l} = \sum_{i=1}^{N_{l-1}} \Delta_i^{l+1} w_{ki}^l \quad (10)$$

Once the first BP is performed from the next layer, l+1, to the current layer, l, then certain embodiments can further back-propagate it to the input delta, $\Delta_k^l$. Let zero order up-sampled map be:
$us_k^1 = up(s_k^1)$, then one can write:

$$\Delta_k^l = \frac{\partial E}{\partial y_k^l} \frac{\partial y_k^l}{\partial x_k^l} = \frac{\partial E}{\partial us_k^l} \frac{\partial us_k^l}{\partial y_k^l} f'(x_k^l) = up(\Delta s_k^l) \beta f'(x_k^l) \quad (11)$$

where
$\beta = (ss)^{-1}$ since each element of $s_k^1$ was obtained by averaging ss number of elements of the intermediate output, $y^1 k$
The inter BP of the delta error $$\left(\Delta s_k^l \xleftarrow{\Sigma} \Delta_i^{l+1}\right)$$

can be expressed as, $$\Delta s_k^l = \sum_{i=1}^{N_{l+1}} conv1Dz(\Delta_i^{l+1}, rev(w_{ki}^l)) \quad (12)$$

where rev(.) reverses the array and conv1Dz(.,.) performs full convolution in 1D with K−1 zero padding. Finally, the weight and bias sensitivities can be expressed as, $$\frac{\partial E}{\partial w_{ki}^l} = conv1D(s_k^l, \Delta_i^{l+1}) \quad \frac{\partial E}{\partial b_k^l} = \sum_n \Delta_k^l(n) \quad (13)$$

Figure 6:
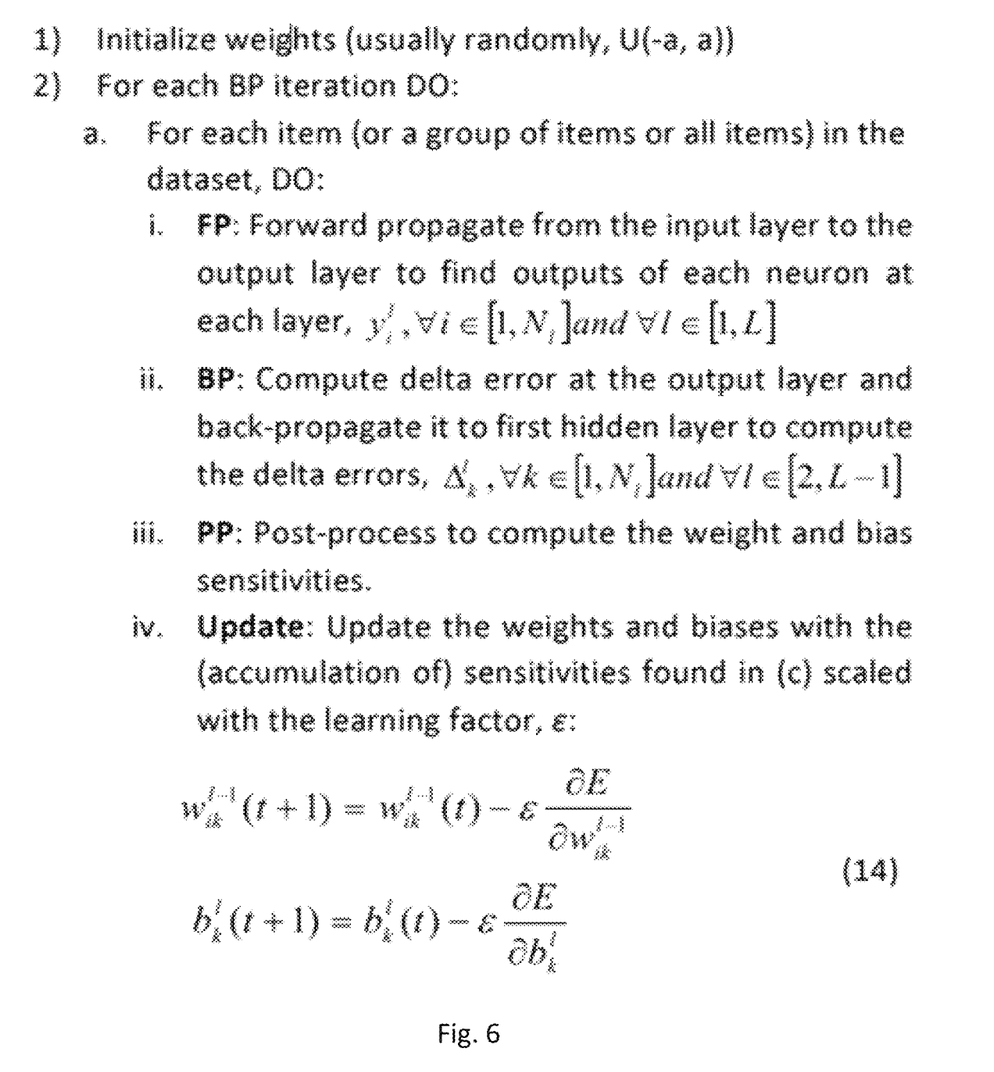
FIG. 6 illustrates a backpropagation algorithm of certain embodiments of the present invention.

As a result, the iterative flow of the BP algorithm for certain embodiments of the present invention can be illustrated in FIG. 6.

As shown in FIG. 6, certain embodiments may forward propagate an input signal, compute delta error at an output layer, compute the weights and biases of the neural network while learning, and update the weights and biases of the neural network.

In view of the above, certain embodiments of the present invention are directed to a fast and accurate system for monitoring motor-conditions and for performing early fault detection within motors. Certain embodiments use an adaptive implementation of 1D Convolutional Neural Networks (CNNs). The adaptive implementation of certain embodiments combine the feature extraction and classification blocks of the motor-fault detection into a single learning body.

Certain embodiments of the present invention can be used in any motor and high-power engine-monitoring system. Certain embodiments can also be used in a personal computing application. Certain embodiments can perform as an automated anomaly detection and classification system for industrial experts.

With the proposed improvements over the traditional CNNs, certain embodiments can classify each motor current signal with any sampling rate. Therefore, certain embodiments may void the need for any manual feature extraction and may void the need for performing post processing.

Figure 7:
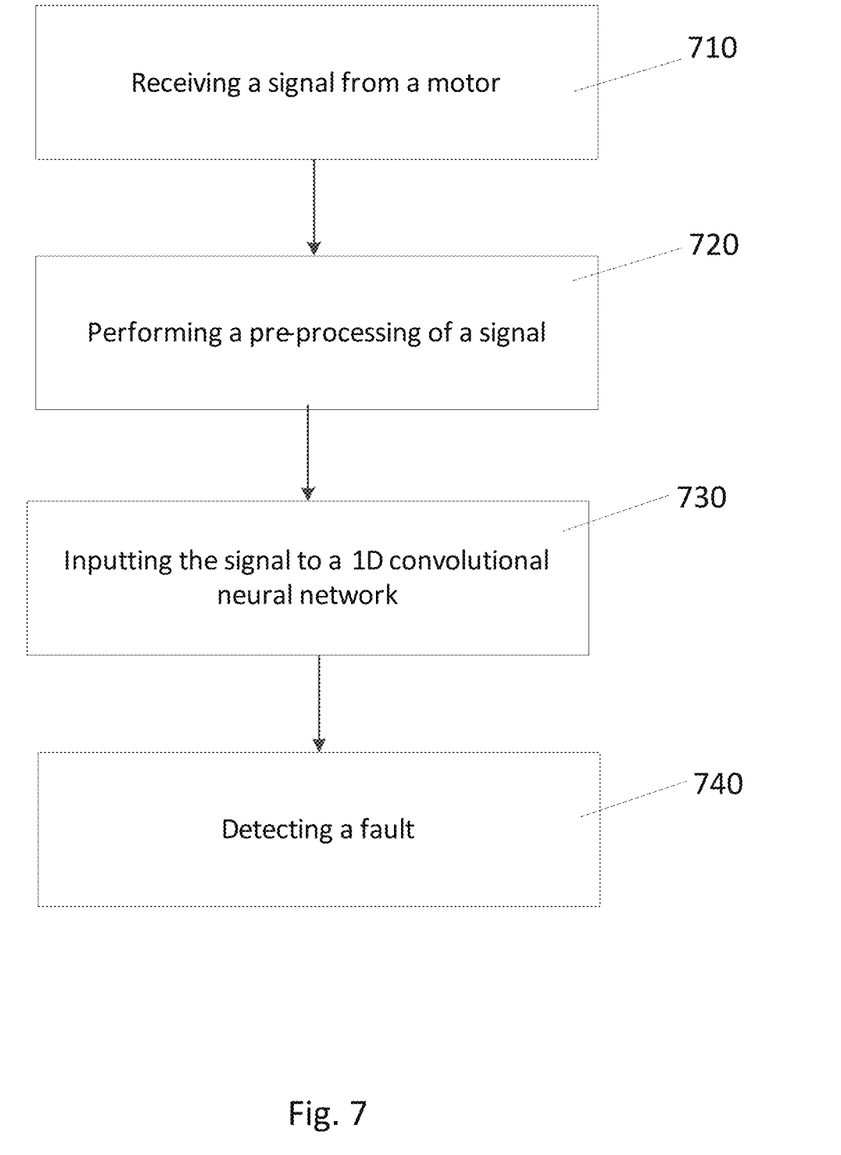
FIG. 7 illustrates a flowchart of a method in accordance with certain embodiments of the invention.

FIG. 7 illustrates a flowchart of a method in accordance with certain embodiments of the invention. The method illustrated in FIG. 7 includes, at 710, receiving a signal from a motor. The signal is received while the motor is operating. The method includes, at 720, performing a pre-processing of the signal. The method also includes, at 730, inputting the signal to a 1D convolutional neural network. The method also includes, at 740, detecting a fault of the motor based on the output of the neural network.

Figure 8:
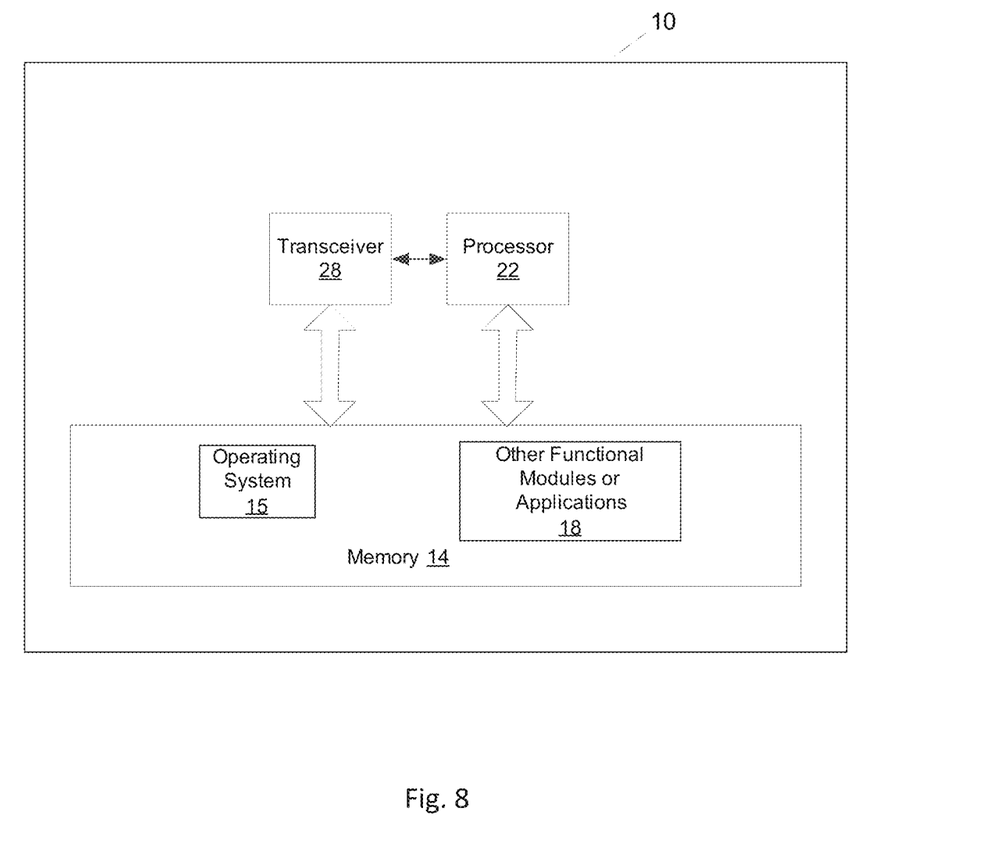
FIG. 8 illustrates an apparatus in accordance with certain embodiments of the invention.

FIG. 8 illustrates an apparatus 10 according to another embodiment. In one embodiment, apparatus 10 may include a neural network that performs motor-fault detection. Although shown as a single system, the functionality of apparatus 10 can be implemented as a distributed system. Apparatus 10 includes a processor 22 for processing information and executing instructions or operations. Processor 22 may be any type of general or specific purpose processor. While a single processor 22 is shown in FIG. 8, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software. In one embodiment, processor 22 may be a processor that functions as a neural network computing architecture. In another embodiment, functional modules 18 can function as a neural network computing architecture.

Apparatus 10 may be configured to receive a signal from a motor. The signal is received while the motor is operating. Apparatus 10 may also be configured to perform a pre-processing of the signal. Apparatus 10 may also be configured to input the signal to a 1D convolutional neural network of apparatus 10. Apparatus 10 may also be configured to detect a fault of the motor based on the output of the neural network.

Figure 9:
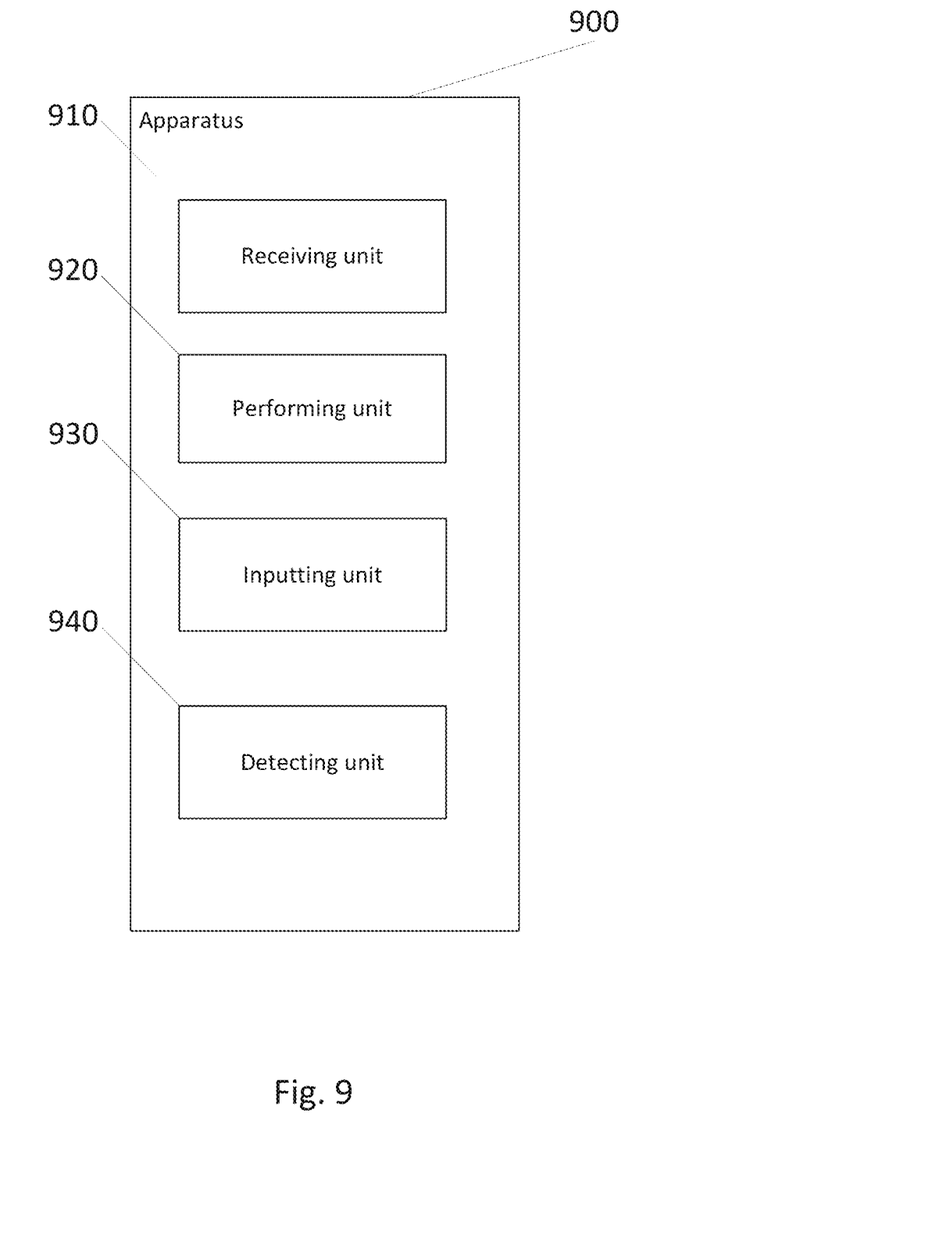
FIG. 9 illustrates an apparatus in accordance with certain embodiments of the invention.

FIG. 9 illustrates an apparatus in accordance with certain embodiments of the invention. Apparatus 900 may also include a receiving unit 910 that receives a signal from a motor. The signal is received while the motor is operating. Apparatus 900 may also include a performing unit 920 that performs a pre-processing of the signal. Apparatus 900 may also include an inputting unit 930 that inputs the signal to a 1D convolutional neural network. Apparatus 900 can also include a detecting unit 940 that detects a fault of the motor based on the output of the neural network.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
receiving a signal from a motor, wherein the signal is received while the motor is operating;
performing a pre-processing of the signal, wherein the pre-processing comprises performing a decimation preceded by an anti-aliasing filtering of the signal to form a decimated signal;
normalizing the decimated signal to have a zero mean and to have a uniform standard deviation;
linearly scaling the normalized decimated signal into a [−1, 1] interval forming a linearly scaled signal;
inputting the linearly scaled signal to a 1D convolutional neural network; and
detecting a fault of the motor based on an output of the 1D convolutional neural network.

2. The method according to claim 1, wherein receiving the signal comprises receiving the signal from an induction motor.

3. The method according to claim 1, wherein receiving the signal comprises receiving a motor current signal.

4. The method according to claim 1, wherein the 1D convolutional neural network is configured to perform a plurality of back-propagation iterations, and to update weights and bias sensitivities of the 1D convolutional neural network for each back-propagation iteration.

5. The method according to claim 1, wherein detecting the fault of the motor comprises detecting a bearing fault of the motor.

6. An apparatus, comprising:
at least one processor; and
at least one memory including computer program code,
the at least one memory and the computer program code configured, with the at least one processor, to cause the apparatus at least to
receive a signal from a motor, wherein the signal is received while the motor is operating;
perform a pre-processing of the signal, wherein the pre-processing comprises performing a decimation preceded by an anti-aliasing filtering of the signal to form a decimated signal;
normalize the decimated signal to have a zero mean and to have a uniform standard deviation;
linearly scale the normalized decimated signal into a [−1, 1] interval forming a linearly scaled signal;
input the linearly scaled signal to a 1D convolutional neural network; and
detect a fault of the motor based on an output of the 1D convolutional neural network.

7. The apparatus according to claim 6, wherein receiving the signal comprises receiving the signal from an induction motor.

8. The apparatus according to claim 6, wherein receiving the signal comprises receiving a motor current signal.

9. The apparatus according to claim 6, wherein the 1D convolutional neural network is configured to perform a plurality of back-propagation iterations, and to update weights and bias sensitivities of the 1D convolutional neural network for each back-propagation iteration.

10. The apparatus according to claim 6, wherein detecting the fault of the motor comprises detecting a bearing fault of the motor.

11. A computer program product embodied on a non-transitory computer readable medium, said computer readable medium having instructions stored thereon that, when executed by a computer, causes the computer to perform a method, comprising:
receiving a signal from a motor, wherein the signal is received while the motor is operating;
performing a pre-processing of the signal, wherein the pre-processing comprises performing a decimation preceded by an anti-aliasing filtering of the signal to form a decimated signal;
normalizing the decimated signal to have a zero mean and to have a uniform standard deviation;
linearly scaling the normalized decimated signal into a [−1, 1] interval forming a linearly scaled signal;
inputting the linearly scaled signal to a 1D convolutional neural network; and
detecting a fault of the motor based on an output of the 1D convolutional neural network.

12. The computer program product according to claim 11, wherein receiving the signal comprises receiving the signal from an induction motor.

13. The computer program product according to claim 11, wherein receiving the signal comprises receiving a motor current signal.

14. The computer program product according to claim 11, wherein the 1D convolutional neural network is configured to perform a plurality of back-propagation iterations, and to update weights and bias sensitivities of the 1D convolutional neural network for each back-propagation iteration.

15. The computer program product according to claim 11, wherein detecting the fault of the motor comprises detecting a bearing fault of the motor.

\* \* \* \* \*